No. 705,493. Patented July 22, 1902.
A. WAHLE.
MECHANICAL MOVEMENT.
(Application filed July 10, 1901.)
(No Model.)
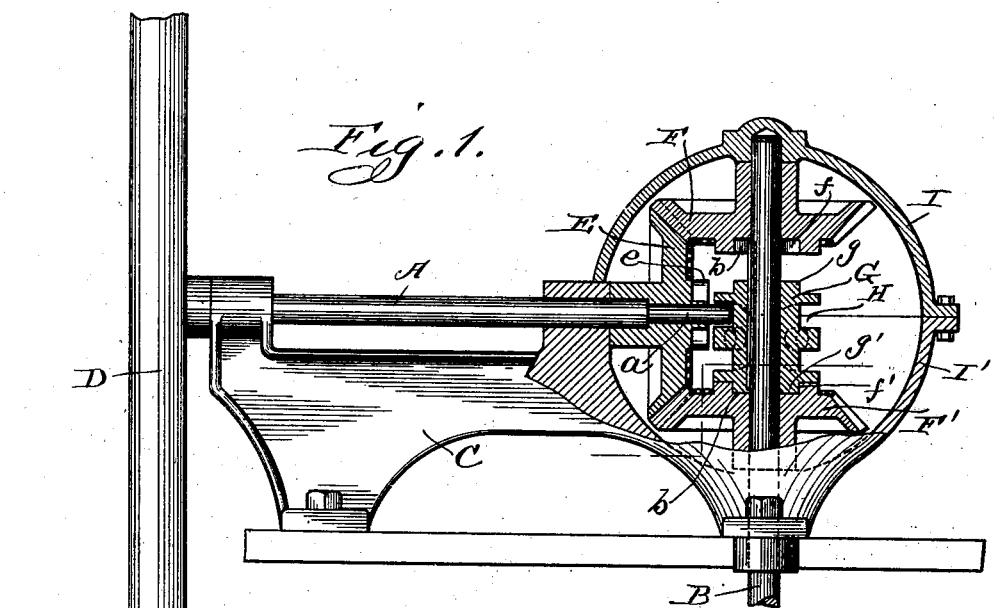
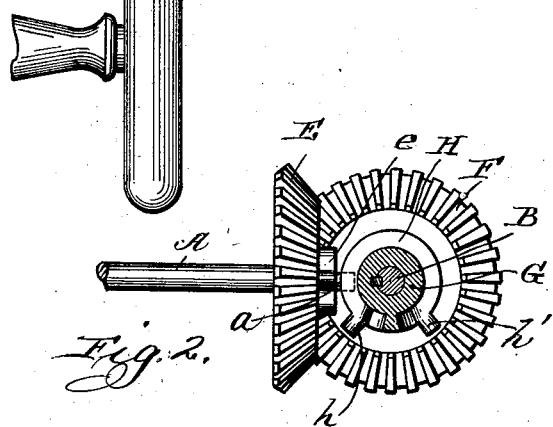
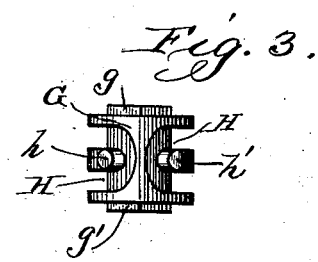
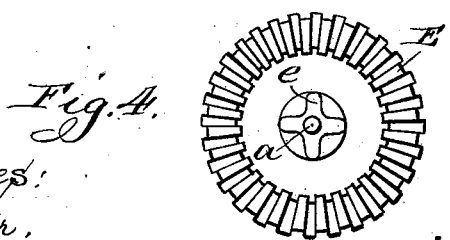
Witnesses:
W. J. Jacker.
M. Friel.
Inventor:
Adolph Wahle,
By Frank D. Thomason,
Atty.

UNITED STATES PATENT OFFICE.

ADOLPH WAHLE, OF DAVENPORT, IOWA.

MECHANICAL MOVEMENT.

SPECIFICATION forming part of Letters Patent No. 705,493, dated July 22, 1902.

Application filed July 10, 1901. Serial No. 67,746. (No model.)

*To all whom it may concern:*

Be it known that I, ADOLPH WAHLE, a citizen of the United States, and a resident of Davenport, in the county of Scott and State of Iowa, have invented certain new and useful Improvements in Mechanical Movements, of which the following is a full, clear, and exact specification.

My invention relates to mechanical movements for converting continuous rotary motion into reciprocating rotary motion, and is particularly adapted for use in washing-machines, churns, and the like, substantially as hereinafter fully described and as particularly pointed out in the claims.

In the drawings, Figure 1 is a view, partially in elevation and partially in section, of devices embodying my invention. Fig. 2 is a detail view showing a plan of the transmitting-gears and a horizontal section of the locking sleeve or clutch. Fig. 3 is a detail view of said locking sleeve or clutch. Fig. 4 is a face view of the drive-gear.

In the drawings, A represents a continuously-revolving drive-shaft, and B a vertical shaft or spindle placed at right angles thereto, to which it is the object of my invention to impart a rotary reciprocatory motion. The devices for operatively connecting these two shafts to accomplish this object embody the essential features of my invention.

Shaft A is journaled in suitable bearings in a supporting-frame C, to which more extended reference will hereinafter be had, and at one end it is provided with a fly-wheel D or other means for operating it and at its opposite end has a bevel-gear E secured fast thereto. The end *a* of shaft A extends through gear E toward spindle B a suitable distance and is preferably reduced in diameter, and the side of said gear E facing spindle B is provided with a concentric star-wheel *e*, which may be cast in one piece therewith or made separate and suitably secured thereto according as desired.

The beveled drive-gear E meshes with two beveled gears F and F', which are loose on spindle B and face each other and are in constant engagement with gear E at diametrically opposite points. The sides of these loose gears facing each other are provided with counterpart boxes *f* and *f'*, respectively, which, as shown, consist of bosses having concentric depressions or recesses *b* therein, the side walls of which are square or polygonal.

Splined on spindle B, between the loose gears F and F', so as to be movable longitudinally on said spindle, but rotatable therewith, is a clutch G, the body of which is preferably cylindrical and of a length less than the distance between the counterpart boxes of the loose gears and the ends of which are each provided with a concentric boss *g g'*, which are square or polygonal and of such dimensions as to be capable of entering the counterpart boxes of one or the other of said loose gears and locking said clutch thereto, so that it will receive the motion of the loose gear with which it is thus in engagement and impart such motion to the spindle.

In order to move the clutch longitudinally, it is provided with two radially-projecting turning-studs *h h'*, which are placed in the same transverse plane, preferably not more than forty-five degrees apart. The length of these studs *h* is such that they are engaged by the star-wheel *e* when the clutch has been rotated to the proper position and is either at the limit of its upward movement or its downward movement on the spindle. Say the clutch is at the limit of its downward movement, as shown in Fig. 1 of the drawings. When the star-wheel is engaged by one of said studs *h h'* the clutch is lifted out of engagement with the lower loose gear F' and into engagement with the upper loose gear F, provided, of course, said clutch and star-wheel are operatively connected. Should the clutch be in engagement with the upper loose gear, the star-wheel is engaged by the other stud, *h'*, and drawn out of engagement with said upper gear and moved downward toward and into engagement with the lower gear.

In order to operatively connect the clutch with the continuously-rotating star-wheel, I have provided said clutch with a transverse runway H, into which the extension *a* of shaft A enters and always moves. This runway comprises two parallel transverse grooves which are in planes an equal distance above and below the transverse plane of the centers of the studs *h h'* and have their ends connected by a semicircular groove the curvature of which is struck from the centers of said studs. This practically makes an endless or elliptical runway, into which the extension *a* of shaft A enters and holds the clutch in its uppermost position in engagement with loose gear F or in its lowermost position in engagement with loose gear F' and keeps the stud in engagement with the star-wheel while the motion of said clutch is being reversed.

I do not desire to be confined to the construction of the ends of clutch G and of the counterpart boxes in the loose gears as hereinbefore described, because it is evident this could be changed without departing from the spirit of my invention.

The operation of my invention is very simple. The points on the drive-gear engaged by the loose gears travel in opposite directions, so that one loose gear will revolve in one direction on the spindle while the other revolves in the opposite direction. Thus when the clutch engages one loose gear it causes spindle B to revolve with said gear in the direction it is traveling, and when said clutch engages the other loose gear it revolves with it in the opposite direction. The clutch and spindle can only revolve according to the length of runway H. As this does not entirely surround or encircle said clutch, the rotation of said spindle first in one direction and then the other falls short of a complete revolution. This, however, for the many purposes to which it is intended to adapt my invention is neither necessary nor desirable.

As a convenient means of shielding the parts I inclose them in a spherical casing, comprising two hemispherical shells I I', projecting from the bearings of the shaft and spindle and secured to each other at their margins by screws or other suitable means.

What I claim as new is—

1. A drive-shaft having continuous rotary motion, a rotary reciprocal shaft at right angles thereto, a bevel-gear secured to said drive-shaft, bevel-pinions in mesh with said gear at opposite points of engagement, loosely revolving on said rotary reciprocal shaft and a sleeve rotating with and having sliding engagement on said rotary reciprocal shaft and adapted to engage either of said pinions and said sleeve having a groove in the periphery thereof in the form of a closed loop having curved ends, the end of said drive-shaft having engagement in and traversing said groove and means on said drive-shaft to bring said sleeve into engagement alternately with said gears.

2. A drive-shaft having continuous rotary motion, a rotary reciprocal shaft, at right angles thereto, a bevel-gear secured to said drive-shaft, bevel-pinions in mesh with said gear at opposite points of engagement loosely revolving on said rotary reciprocal shaft, and a sleeve rotating with and having sliding engagement on said rotary reciprocal shaft and adapted to engage either of said pinions, and said sleeve having a groove on the periphery thereof in the form of a loop having curved ends, the end of said shaft having engagement in and traversing said groove, a radially-projecting stud secured in said sleeve at the radial center of each of said curved loop ends, and a star-wheel secured on said drive-shaft adapted to alternately engage said studs and throw said sleeve into engagement alternately with said pinions.

3. The combination with a main frame and a continuously-revoluble drive-shaft secured in bearings in said frame, of a rotary reciprocal shaft secured at right angles to said drive-shaft, in bearings in said frame, a bevel-gear secured to said drive-shaft, bevel-pinions in mesh with said gear at opposite points of engagement loosely revolving on said rotary reciprocal shaft, a sleeve rotating with and having sliding engagement on said spindle between said pinions, adapted to engage either of said pinions and said sleeve having a groove on the periphery thereof in the form of a closed elliptical loop, radially-projecting studs secured to said sleeve at the radial center of each of said curved ends of the loop, the end of said drive-shaft being adapted to have engagement with and traverse said loop, a star-wheel on said drive-shaft alternately engaging said studs and a spherical casing extending from the bearings of said spindle and inclosing said pinions and gears.

4. A drive-shaft having continuous rotary motion, a rotary reciprocal shaft at right angles thereto, a beveled gear secured to said drive-shaft, bevel-pinions loose on said rotary reciprocal shaft in mesh with said gear at opposite points of engagement, and a sleeve rotating with and having sliding engagement on said rotary reciprocal shaft, and adapted to engage either of said pinions, and said sleeve having an endless loop-shaped groove, and means to bring said sleeve into engagement alternately with said pinions.

ADOLPH WAHLE.

Witnesses:
WM. W. WAHLE,
LOUIS L. WAHLE.